United States Patent
Aitken (10) Patent No.: US 7,472,201 B1
(45) Date of Patent: Dec. 30, 2008

(54) METHOD AND SYSTEM FOR RESOLVING DOMAIN NAME SYSTEM QUERIES IN A MULTIPROTOCOL COMMUNICATIONS NETWORK

(75) Inventor: Paul J. Aitken, Peeblesshire (GB)

(73) Assignee: Cisco Technology, Inc., San Jose, CA (US)

( * ) Notice: Subject to any disclaimer, the term of this patent is extended or adjusted under 35 U.S.C. 154(b) by 1155 days.

(21) Appl. No.: 10/242,240

(22) Filed: Sep. 12, 2002

(51) Int. Cl.
*G06F 15/16* (2006.01)

(52) U.S. Cl. ..................................... 709/245
(58) Field of Classification Search ................. 709/245
See application file for complete search history.

(56) References Cited

U.S. PATENT DOCUMENTS

| | | | | |
|---|---|---|---|---|
| 6,038,233 | A * | 3/2000 | Hamamoto et al. | 370/401 |
| 6,118,784 | A * | 9/2000 | Tsuchiya et al. | 370/401 |
| 6,243,749 | B1 | 6/2001 | Sitaraman et al. | 709/223 |
| 6,286,039 | B1 | 9/2001 | Van Horne et al. | 709/221 |
| 6,324,585 | B1 | 11/2001 | Zhang et al. | 709/245 |
| 6,425,003 | B1 * | 7/2002 | Herzog et al. | 709/223 |
| 6,427,170 | B1 | 7/2002 | Sitaraman et al. | 709/226 |
| 6,580,717 | B1 * | 6/2003 | Higuchi et al. | 370/401 |

OTHER PUBLICATIONS

"Internet Protocol Version 6," http://research.microsoft.com/msripv6/msripv6.htm, Aug. 21, 2002, 3 pages.

Mockapetris, P., Request for Comments: 1035, "Domain Names—Implementation and Specification," Nov. 1987, pp. 1-52.
Mockapetris, P., Request for Comments: 1034, "Domain Names—Concepts and Facilities," Nov. 1987, pp. 1-55.
Gilligan, R. and Nordmark, E., Request for Comments: 2893, "Transition Mechanisms for IPv6 Hosts and Routers," Aug. 2000, pp. 1-29.
Crawford, M. and Huitema, C., Request for Comments: 2874, "DNS Extensions to Support IPv6 Address Aggregation and Renumbering," Jul. 2000, pp. 1-20.
Narten, T. and Draves, R., Request for Comments: 3041, "Privacy Extensions for Stateless Address Autoconfiguration in IPv6," Jan. 2001, pp. 1-17.
Deering, S. and Hinden, R., Request for Comments: 2460, "Internet Protocol, Version 6 (IPv6) Specification," Dec. 1998, pp. 1-39.

(Continued)

*Primary Examiner*—Jason Cardone
*Assistant Examiner*—Mitra Kianersi
(74) *Attorney, Agent, or Firm*—Campbell Stephenson LLP (57) ABSTRACT

A method and system for resolving domain name system (DNS) queries in a multiprotocol communications network is disclosed. The disclosed method includes in one embodiment receiving a destination address from a DNS server utilizing a first protocol; and communicating with a network element associated with the destination address utilizing a second protocol. In another embodiment, the disclosed method includes maintaining a profile for the DNS server and selecting the DNS server from a plurality of DNS servers utilizing the profile. In yet another embodiment, the disclosed method includes requesting a first address from the DNS server, where the first address is formatted according to a primary protocol, detecting a request failure in response to the request, and requesting a second address from the DNS server, where the second address is formatted according to a secondary protocol, in response to detecting the request failure.

31 Claims, 11 Drawing Sheets

OTHER PUBLICATIONS

Thompson, S. and Huitema, C., Request for Comments: 1886, "DNS Extensions to Support IP Version 6," Dec. 1995, pp. 1-5.

Austein, R. and Saperia, J., Request for Comments: 1612, "DNS Resolver MIB Extensions," May 1994, pp. 1-32.

Draves, R., "Default Address Selection for IPv6—select-07," Mar. 1, 2002, 46 pages.

Draves, R., "Default Address Selection for IPv6—select-09," Aug. 6, 2002, 50 pages.

Draves, R., "Default Address Selection for IPv6—select-00," Oct. 22, 1999, 19 pages.

Draves, R., "Default Address Selection for IPv6—select-01," Jul. 14, 2000, 23 pages.

Draves, R., "Default Address Selection for IPv6—select-02," Nov. 24, 2000, 37 pages.

Draves, R., "Default Address Selection for IPv6—select-05," Jun. 4, 2001, 21 pages.

Draves, R., "Default Address Selection for IPv6—select-06," Sep. 28, 2001, 43 pages.

Hagino, J. and Yamamoto, K., Request for Comments: 3142, "An IPv6-to-IPv4 Transport Relay Transistor." Jun. 2001, pp. 1-10.

Austein, R., Request for Comments: 3364, "Tradeoffs in Domain Name System (DNS) Support for Internet Protocol version 6 (IPv6)," Aug. 2002, pp. 1-10.

Bush, R., Durand, A., Fink, B., Gudmundsson, O. and Hain, T., Request for Comments: 3363, "Representing Internet Protocol version 6 (IPv6) Addresses in the Domain Name System (DNS)," Aug. 2002, pp. 1-6.

Durand, A. and Ihren, J., "NGtrans IPv6 DNS operational requirements and roadmap—draft-ieft-ngtrans-dns-ops-req-04,txt," Mar. 1, 2002, pp. 1-9.

Nordmark, E. and Gilligan, R. E., "Transition Mechanisms for IPv6 Hosts and Routers—<draft-ieft-ngtrans-mech-v2-00.txt>," Jul. 17, 2002, pp. 1-21.

* cited by examiner

Figure 1    Prior Art

| IDENTIFICATION | PARAMETER |
|---|---|
| NUMBER OF QUESTIONS | NUMBER OF ANSWERS |
| NUMBER OF AUTHORITY | NUMBER OF ADDITIONAL |
| QUESTION SECTION ||
| ANSWER SECTION ||
| AUTHORITY SECTION ||
| ADDITIONAL INFORMATION SECTION ||

| DNS server identifier | Resource Record Types | | | |
| --- | --- | --- | --- | --- |
| | A | AAAA | A6 | MX |
| dns-v4 | 4 | 0 | 0 | 0 |
| dns-v6 | 0 | 3 | 1 | 0 |

METHOD AND SYSTEM FOR RESOLVING DOMAIN NAME SYSTEM QUERIES IN A MULTIPROTOCOL COMMUNICATIONS NETWORK

BACKGROUND

1. Technical Field

The present invention relates to communication networks generally. More specifically, the present invention relates to a method and system for resolving Domain Name System (DNS) queries in a multiprotocol communications network.

2. Description of the Related Art

In many conventional communications networks, a domain name system (DNS) is used to translate between textual domain name strings often utilized as user labels for network elements (hosts, routers, etc.) and numerical addresses utilized to route data between source and destination nodes within communications network domains. A DNS system typically includes one or more DNS clients (e.g., an Internet browser client application) and one or more DNS servers (e.g., resolvers, name servers, etc.) arranged hierarchically within network elements of a communications network.

In many conventional communications networks, a single protocol, (e.g., IPv4) is implemented at the network layer level. As other network layer protocols, (e.g., IPv6) have been introduced, multiprotocol communications networks including network elements which implement any of two or more network-layer protocols exclusively and/or multiple protocols simultaneously have become more prevalent.

Figure 1:
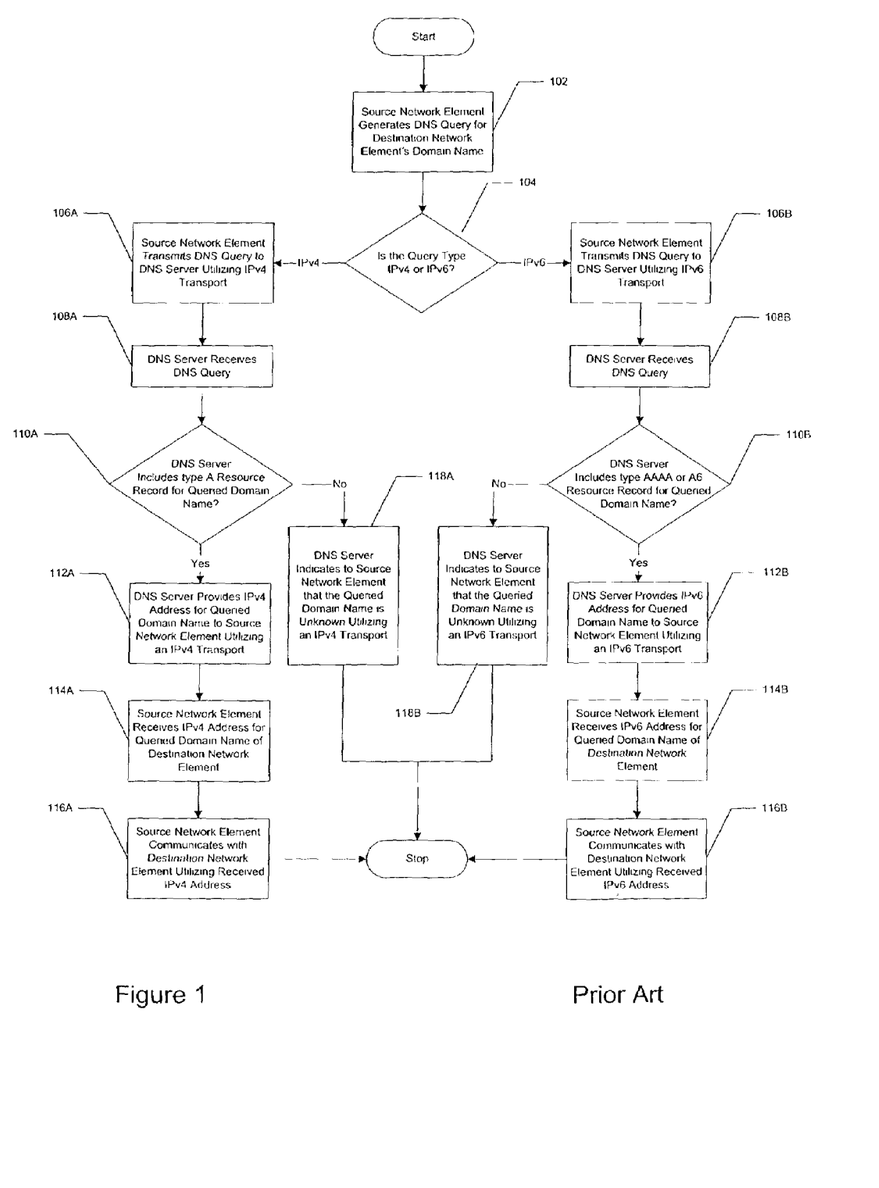
FIG. 1 is a high-level process flow diagram of a domain name system (DNS) query resolution process according to the prior art.

FIG. 1 is a high-level process flow diagram of a domain name system (DNS) query resolution process according to the prior art. In the illustrated process, a source network element first generates a domain name system (DNS) query for a destination network element's domain name (process block 102). As will be described in greater detail with respect to FIG. 2, a standard DNS query includes a destination or "target" domain name to be resolved, a query type specifying the type of resource record requested in the query, and query class. A determination is then made whether the query type of the generated query specifies a resource record associated with an IPv4 address (e.g., an A record) or an IPv6 address (e.g., a AAAA or A6 record) (process block 104).

Following a determination that an IPv4-type resource record type has been requested, the source network element transmits the generated DNS query to a DNS server utilizing an IPv4 transport (process block 106A). Each DNS client is capable of contacting at least one DNS server (e.g., the name server for the DNS client's domain). DNS servers use a well-known protocol port for all communication, so clients may consequently communicate with a server once the address of the machine in which the name server executes is known. In some systems the address of the machine that supplies domain name service is bound into application programs at compile time while in others the address is configured into the operating system at startup. In still others systems, an administrator places the address of a name server in a file on secondary storage.

The DNS server receives the source network element-transmitted DNS query (process block 108A) and attempts to resolve the query. A determination is then made whether or not the queried DNS server includes an IPv4 address resource record (A record) corresponding to the query-specified domain name (process block 110A). If so, the DNS server provides the IPv4 address to the source network element (process block 112A). The source network element then receives the IPv4 address (process block 114A) and utilizes it to communicate with the destination network element (process block 116A). According to the prior art, the transmission of IPv4 addresses from the DNS server to the source network element (process block 112A) and communication between the source and destination network elements (process block 116A) is performed using the same transport type as was utilized to transmit the DNS query to the DNS server (process block 106A) (i.e., IPv4).

If a determination is made that the queried DNS server does not include an IPv4 address resource record (an A record) corresponding to the query-specified domain name, the DNS server indicates to the source network element that the queried name is unknown utilizing an IPv4 transport (process block 118A) and the process of the illustrated embodiment is terminated. In an alternative prior art embodiment not illustrated by FIG. 1, if a determination is made that the IP address resource record cannot be provided the DNS server determines whether the DNS query is recursive or iterative. For a recursive DNS query, the DNS server recursively queries other DNS servers to resolve the query and then provides the resolved IPv4 address to the source network element. For an iterative DNS query, the DNS server generates a reply utilizing an IPv4 transport which specifies another DNS server that the source network element should contact.

Following a determination that an IPv6-type resource record has been requested, a procedure (process blocks 106B-118B) paralleling that described with respect to process blocks 106A-118A is performed. As with the previously described procedure, the transmission of IPv6 addresses from the DNS server to the source network element (process block 112B) and communication between the source and destination network elements (process block 116B) is performed using the same transport type, (IPv6 here), as that utilized to transmit the DNS query to the DNS server (process block 106B).

As will be apparent from the preceding description, conventional methods of resolving DNS queries within multiprotocol (e.g., mixed IPv4 and IPv6) communications networks suffer from several drawbacks. One such drawback, illustrated by FIG. 1, is that such conventional methods require that the same protocol (i.e., either IPv4 or IPv6) is utilized to perform a DNS query as will be utilized to communicate with the destination network element which is the subject of the DNS query. Consequently, resource records (e.g., A records for IPv4 addresses and AAAA or A6 records for IPv6 addresses) associated with a given protocol are prevented from being usefully stored within and accessed from a DNS server which is not compatible with that particular protocol, making a transition from IPv4 to IPv6 more difficult and costly.

Another significant drawback associated with conventional DNS query resolution methods is that in using such methods, it is typically presumed that no DNS server is any more likely or capable of resolving a DNS query than any other DNS server. Accordingly, in generating iterative DNS queries, a DNS client software application (or DNS server attempting to resolve a recursive DNS client query) will typically query each DNS server it has access to in turn in order to resolve a DNS query. Although the performance penalty associated with this technique is relatively small for the majority of network elements (e.g., hosts) which have access to only one primary and possibly one secondary DNS server, it may be substantially larger for other network elements (e.g., network elements within a corporate communications network, routers, etc.) having access to a greater number of DNS servers.

SUMMARY OF THE INVENTION

A method and system for resolving domain name system queries in a multiprotocol communications network is disclosed. The disclosed method includes receiving a destination address from a domain name system (DNS) server utilizing a first protocol (e.g., a first network-layer protocol); and communicating with a network element associated with the destination address utilizing a second protocol (e.g., a second network-layer protocol).

In another embodiment, the disclosed method includes maintaining a profile of each known DNS server and selecting the DNS server from a plurality of DNS servers utilizing the profile.

In yet another embodiment, one of the first protocol and the second protocol is a primary protocol and the other is a secondary protocol and the disclosed method includes requesting a first address from the DNS server, where the first address is formatted according to the primary protocol, detecting a request failure in response to the request, and requesting a second address from the DNS server, where the second address is formatted according to the secondary protocol, in response to detecting the request failure.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

Embodiments of the present invention are illustrated by way of example and not limitation in the figures of the accompanying drawings in which similar references are utilized to indicate similar elements and in which.

DETAILED DESCRIPTION

Embodiments of the present invention may include features or processes embodied within machine-executable instructions provided by a machine-accessible medium. Such a medium may include any mechanism which provides (i.e., stores and/or transmits) data in a form accessible by a machine (e.g., a data processing system, host, router, or other network element, etc.). For example, a machine-accessible medium may include volatile and/or non-volatile media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Such instructions can be used to cause a general or special purpose processor, programmed with the instructions, to perform processes of the present invention. Alternatively, processes of the present invention may be performed by specific hardware components containing hard-wired logic to perform operations or by any combination of programmed data processing components and hardware components. Thus, embodiments of the present invention may include software, data processing hardware, data processing system-implemented methods, and various processing operations, further described herein.

Figure 2:
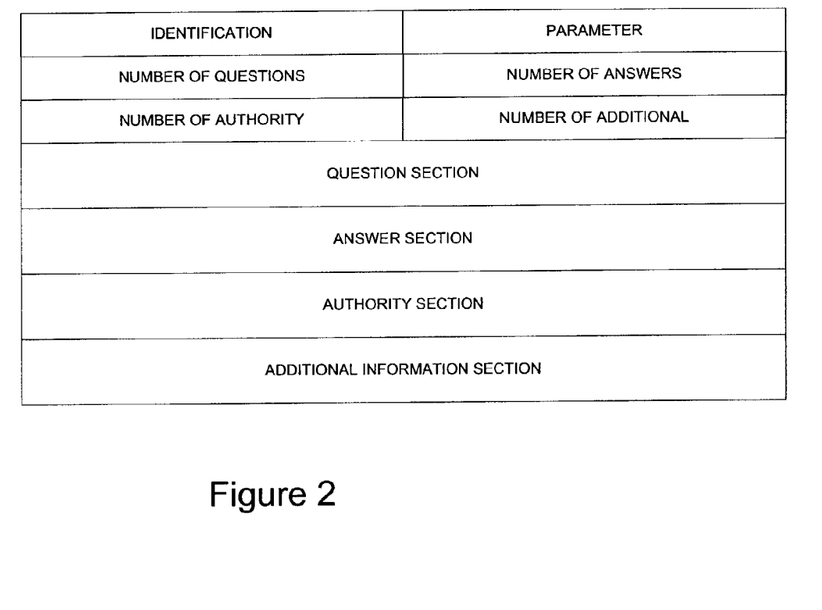
FIG. 2 is a block diagram of a DNS server query message useable with one or more embodiments of the present invention.

FIG. 2 is a block diagram of a domain name system (DNS) server query message useable with one or more embodiments of the present invention. The illustrated DNS server query message includes a header having a unique IDENTIFICATION field which a client may use to match responses to queries, and a PARAMETER field which may be utilized to specify a requested operation and response code. According to one embodiment, the illustrated PARAMETER field includes an operation bit field specifying whether the message is a query or a response, one or more query type bit fields specifying the kind of query in the message (e.g., a standard query, inverse query, server status request, etc.), an authoritative resolution bit field specifying whether the responding DNS server is an authority for the domain in question, a truncation bit field specifying whether the message was truncated due to length greater than that permitted on the transmission channel, a recursion desired bit field which may be set in a query and copied in the response to direct the name server to pursue a query recursively, a recursion available bit field which may be set in a response to denote whether recursive query support is available in the DNS server, and a response type bit field which may be set in responses to indicate various types of errors that may have occurred.

Also included within the header section of the illustrated server query message format are a number of questions field specifying the number of questions within the question section, a number of answers field specifying the number of resource records in the answer section, a number of authority field specifying the number of resource records in the authority records section, and a number of additional field specifying the number of resource records in the additional records section. According to one embodiment of the present invention, each query contained within the question section of a DNS server query message includes a query domain name followed by query type and query class fields described herein.

Figure 3A:
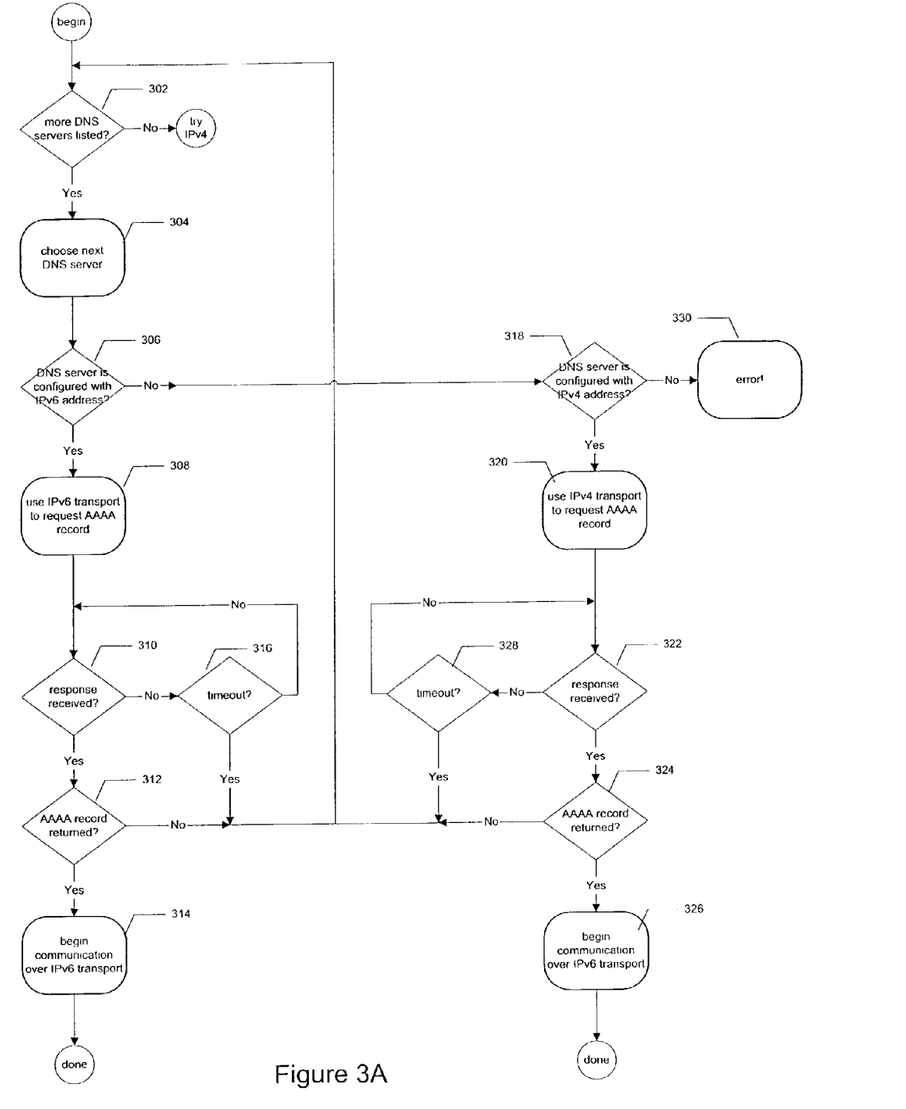
FIG. 3A is a high-level process flow diagram of a first portion of a domain name system (DNS) query resolution process according to an embodiment of the present invention.

FIG. 3A is a high-level process flow diagram of a first portion of a domain name system (DNS) query resolution process according to an embodiment of the present invention. In the illustrated process embodiment of FIGS. 3A and 3B, a transitionary DNS strategy is employed for use in multiprotocol communications networks in which an IPv4-type address (e.g., an A resource record) is requested only after an IPv6-type address (e.g., AAAA and A6 resource records) has been requested and the request has failed.

Accordingly, a determination is made at the beginning of the portion of the DNS query resolution process illustrated in FIG. 3A whether there are any accessible DNS servers to which a request for an IPv6-type address has not yet been made (process block 302). If not, a corresponding IPv4-type address is requested in the portion of the DNS query resolution process illustrated in FIG. 3B. Otherwise, another DNS server is selected (process block 304) and a determination is made whether the selected DNS server is configured to be accessed utilizing an IPv6 or IPv4 address as illustrated by process blocks 306 and 318, respectively. If the selected DNS server is not accessible via an IPv6 or IPv4 address an error is reported (process block 330) and the illustrated process embodiment is terminated.

If the selected DNS server is accessible utilizing an IPv6 address, an IPv6 transport is utilized to request an AAAA record (process block 308). It will be readily appreciated that alternative embodiments of the invention may be practiced in which any other alternative resource record type(s) (e.g., A6, Canonical name, Mail Exchanger, Name Server, Pointer, Start of Authority, etc.) may be substituted for the requested AAAA record. Thereafter, the illustrated process embodiment continues until a response to the DNS query is received (process block 310) or a timeout occurs (process block 316). If a response is received, a determination is made whether or not the response includes the requested AAAA resource record (process block 312). If either the requested resource record is not returned or a timeout occurs, the illustrated process embodiment is restarted as additional DNS servers to query are sought (process block 302). Alternatively, a communication session is begun utilizing the returned AAAA resource record over an IPv6 transport (process block 314) before terminating the illustrated process embodiment.

If the selected DNS server is accessible utilizing an IPv4 address, an IPv4 transport is utilized to request an AAAA record (process block 320) in contrast to conventional DNS query resolution methods in which only an IPv6 transport may be utilized to request an IPv6-type address such as an AAAA record. Thereafter, the illustrated process embodiment continues until a response to the DNS query is received (process block 322) or a timeout occurs (process block 328). If a response is received, a determination is made whether or not the response includes the requested AAAA resource record (process block 324). If either the requested resource record is not returned or a timeout occurs, the illustrated process embodiment is restarted as additional DNS servers to query are sought (process block 302). Alternatively, a communication session is begun utilizing the returned AAAA resource record over an IPv6 transport (process block 326) before terminating the illustrated process embodiment.

Figure 3B:
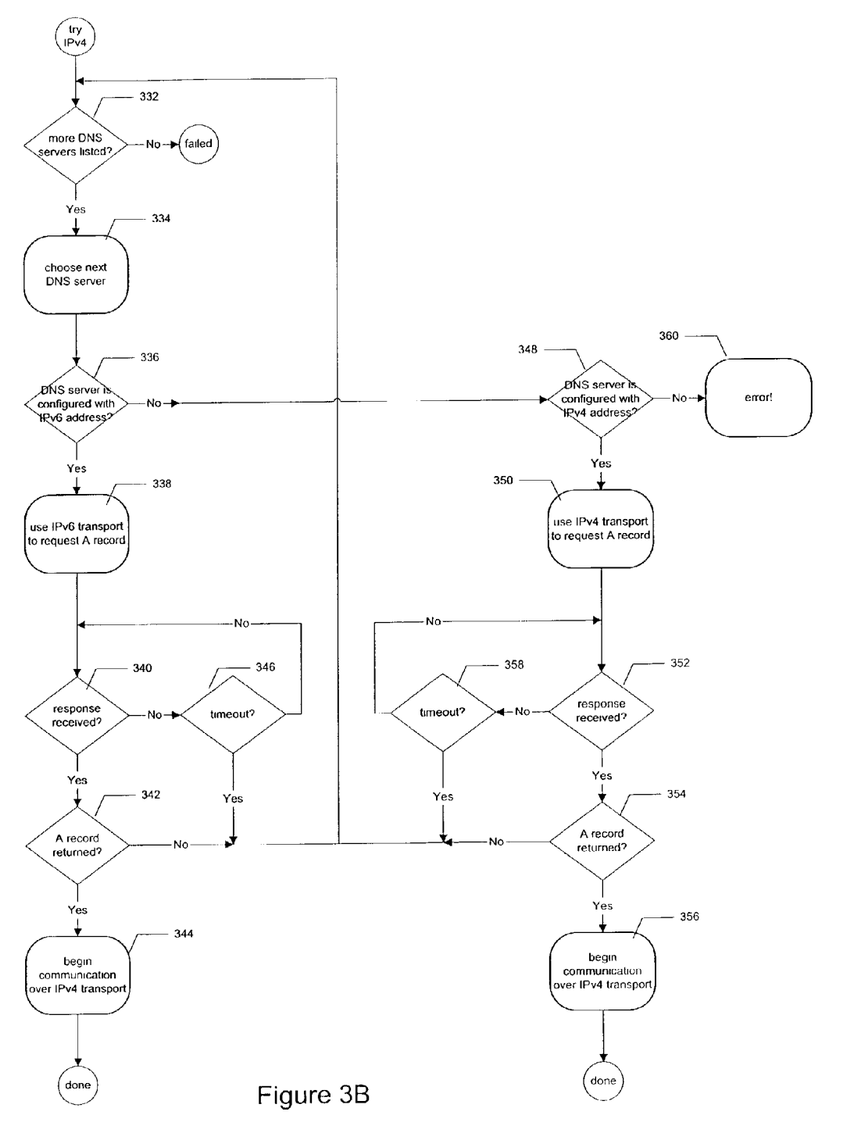
FIG. 3B is a high-level process flow diagram of a second portion of a domain name system (DNS) query resolution process according to an embodiment of the present invention.

FIG. 3B is a high-level process flow diagram of a second portion of a domain name system (DNS) query resolution process according to an embodiment of the present invention.

To the extent that the portion of the DNS query resolution process embodiment illustrated by FIG. 3B is only performed if no corresponding IPv6-type address may be retrieved from an accessible DNS server it may be considered optional. As with the first portion of the DNS query resolution process illustrated by FIG. 3A, a determination is first made in the illustrated process embodiment whether there are any accessible DNS servers to which a request for an IPv4-type address has not yet been made (process block 332). If not, the DNS query resolution process fails and the illustrated process embodiment is terminated. Otherwise, another DNS server is selected (process block 334) and a determination is made whether the selected DNS server is configured to be accessed utilizing an IPv6 or IPv4 address as illustrated by process blocks 336 and 348, respectively. If the selected DNS server is not accessible via an IPv6 or an IPv4 address an error is reported (process block 360) and the illustrated process embodiment is terminated.

If the selected DNS server is accessible utilizing an IPv6 address, an IPv6 transport is utilized to request an A record (process block 338) in contrast to conventional DNS query resolution methods in which only an IPv4 transport is utilized to request an IPv4-type address such as an A record. Thereafter, the illustrated process embodiment continues until a response to the DNS query is received (process block 340) or a timeout occurs (process block 346). If a response is received, a determination is made whether or not the response includes the requested A resource record (process block 342). If either the requested resource record is not returned or a timeout occurs, the illustrated process embodiment is restarted as additional DNS servers to query are sought (process block 332). Alternatively, a communication session is begun utilizing the returned A resource record over an IPv4 transport (process block 344) before terminating the illustrated process embodiment.

If the selected DNS server is accessible utilizing an IPv4 address, an IPv4 transport is utilized to request an A record (process block 350). Thereafter, the illustrated process embodiment continues until a response to the DNS query is received (process block 352) or a timeout occurs (process block 358). If a response is received, a determination is made whether or not the response includes the requested A resource record (process block 354). If either the requested resource record is not returned or a timeout occurs, the illustrated process embodiment is restarted as additional DNS servers to query are sought (process block 332). Alternatively, a communication session is begun utilizing the returned A resource record over an IPv4 transport (process block 356) before terminating the illustrated process embodiment.

In one alternative embodiment of the present invention, a query is generated and transmitted substantially in parallel to a selected DNS server for each of a number of resource record types (e.g., for a type A and type AAAA resource record) rather than serially as described herein with respect to process blocks 308, 320, 338 and 350 of FIGS. 3A and 3B. In the described embodiment, DNS server responses, if any, for one resource record type (e.g., type A records) may be cached and utilized only upon a determination that no resource records of the other type (e.g., type AAAA records) were available. In another similar embodiment, such parallel DNS queries are transmitted by a DNS client to each of its available DNS servers substantially simultaneously with the responses being parsed and utilized upon receipt as described herein (e.g., caching and utilizing type A records when no AAAA type records are available).

Figure 4:
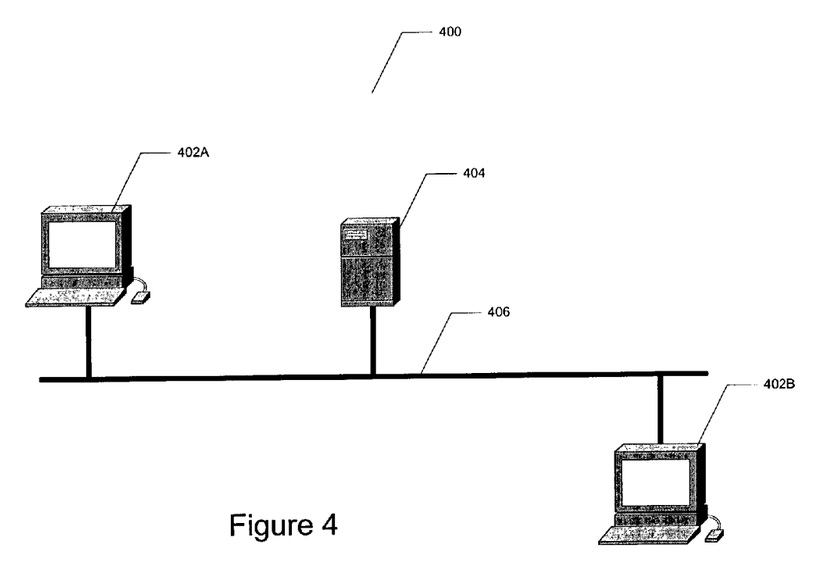
FIG. 4 is a block diagram of a communications network useable with one or more embodiments of the present invention.

FIG. 4 is a block diagram of a communications network useable with one or more embodiments of the present invention. The communications network 400 of the illustrated embodiment includes a source network element 402A, a destination network element 402B, and a DNS server 404 coupled together via a communication medium 406 (e.g., an Ethernet, token ring, Fiber Distributed Data Interface, etc.). According to an embodiment of the present invention, DNS server 404 and source and destination network elements 402A and 402B are implemented within data processing systems (e.g., hosts). In the illustrated embodiment, source network element 402A is a multiprotocol or "dual-stack" node, capable of operating utilizing multiple network-layer protocols, (e.g., IPv4 and IPv6). In another embodiment of the present invention source network element 402A performs the process described with respect to FIGS. 3A and 3B to perform a DNS lookup from DNS server 404 on, and subsequently communicate with, destination network element 402B over communication medium 406.

Figure 5:
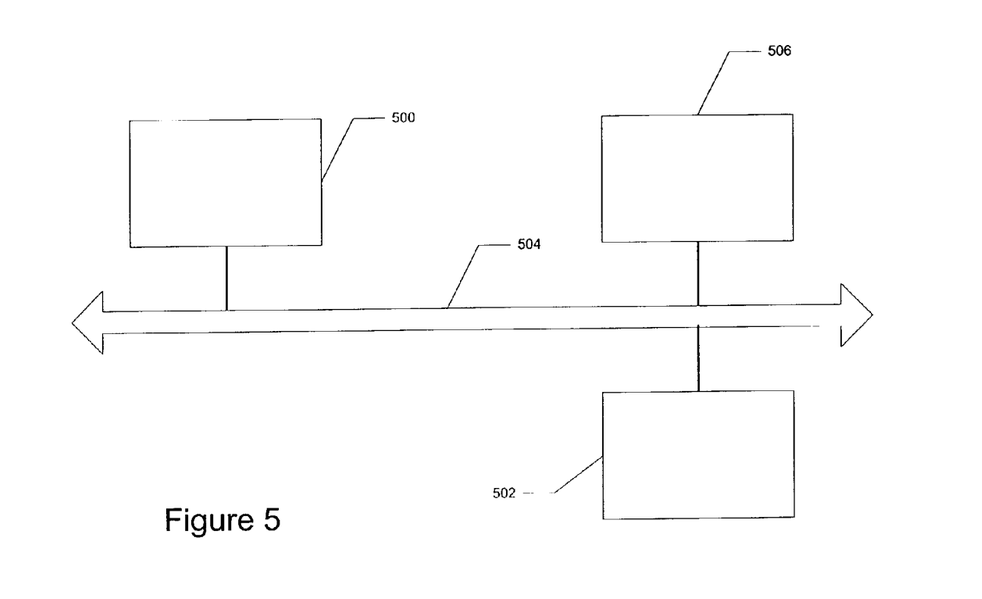
FIG. 5 is a block diagram of an exemplary network element data processing system according to an embodiment of the present invention.

FIG. 5 is a block diagram of a network element data processing system (e.g. a DNS server and/or DNS client) according to an embodiment of the present invention. The data processing system of the illustrated embodiment includes a processor 500 and a memory 502 communicatively coupled together via a bus 504 or other communication interconnect and further includes a communications port 506 (e.g., a modem, network interface, etc.) as shown. According to one embodiment of the present invention, memory 502 serves as a machine-readable medium as described herein, providing data and instructions to and receiving processed data from processor 500 via bus 504.

Data processing systems according to alternative embodiments of the present invention may include additional elements and/or features. For example, according to one embodiment, a data processing system may include various input/output devices (e.g., keyboards, cursor control devices, displays, printers, scanners, etc.), additional processors, memories, buses, and the like. Similarly, a data processing system according to an embodiment of the present invention may be embodied within a wide variety of data processing devices (e.g., personal computers, workstations, servers, thin clients, routers, gateways, personal digital assistants, etc.).

Figure 6:
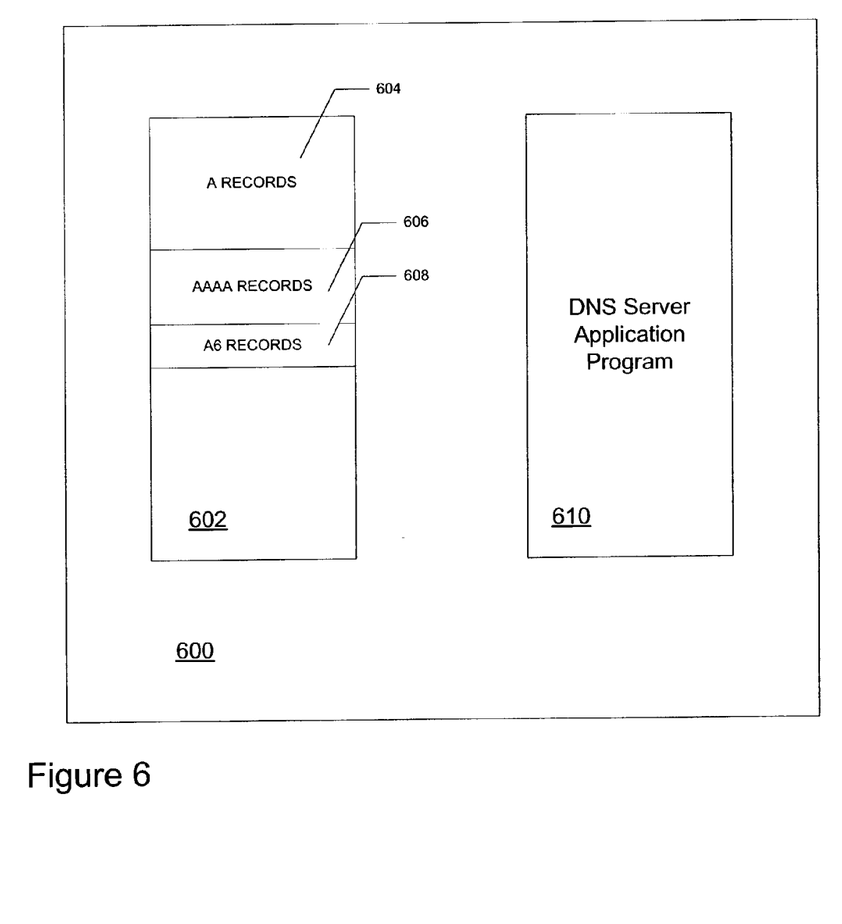
FIG. 6 is a conceptual block diagram of a memory space of a DNS server network element data processing system according to one embodiment of the present invention.

FIG. 6 is a conceptual block diagram of a memory space of a domain name system (DNS) server network element data processing system according to one embodiment of the present invention. Memory space 600 of the illustrated embodiment includes a first memory region 602 to store resource records such as A resource records 604, AAAA resource records 606, A6 resource records 608, etc. as well as a second memory region 610 to store a DNS server application program to perform features, methods, and process operations of various embodiments of the present invention.

Figure 7:
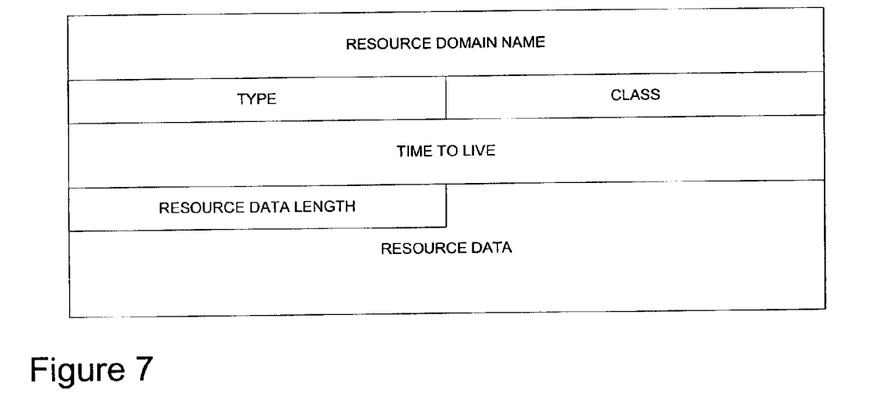
FIG. 7 is a block diagram of a resource record useable with one or more embodiments of the present invention.

FIG. 7 is a block diagram of a resource record useable with one or more embodiments of the present invention. For example, according an embodiment of the present invention the illustrated resource record comprises an address resource record (e.g., a type A, AAAA, or A6 resource record). According to another embodiment, the RESOURCE DOMAIN NAME field contains the domain name to which this resource record refers; the TYPE field specifies the type of data included in the resource record; the CLASS field specifies the data's class; the TIME TO LIVE field contains a number specifying the number of seconds information in this resource record can be cached which may be used, for example, by DNS clients who have requested a name binding which want to cache the results. Also included with the depicted resource record is a RESOURCE DATA LENGTH field specifying the number of octets in a RESOURCE DATA field.

Figure 8:
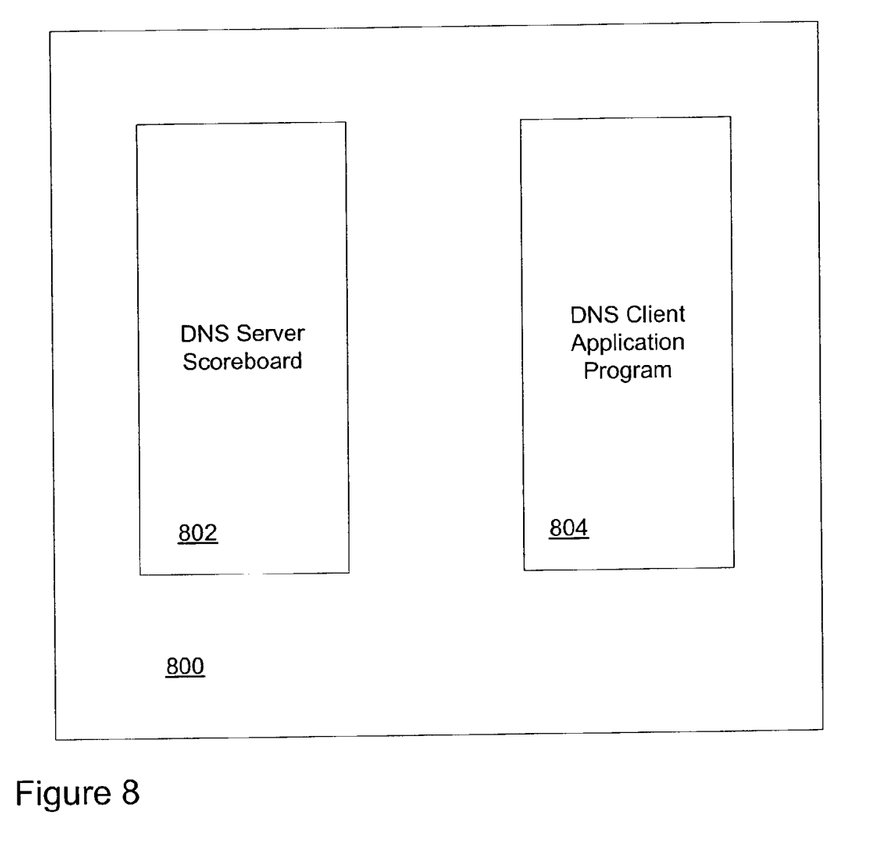
FIG. 8 is a conceptual block diagram of a memory space of a DNS client network element data processing system according to one embodiment of the present invention.

FIG. 8 is a conceptual block diagram of a memory space of a DNS client network element data processing system according to one embodiment of the present invention. Memory space 800 of the illustrated embodiment includes a first memory region 802 to store a server profiling data structure as well as a second memory region 804 to store a DNS client application program to perform features, methods, and process operations of various embodiments of the present invention.

Figure 9:
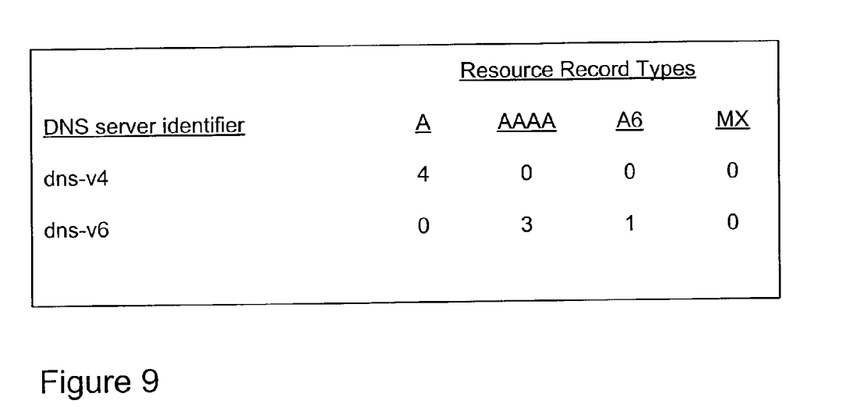
FIG. 9 is a block diagram of DNS server profiling data structure according to one embodiment of the present invention.

FIG. 9 is a block diagram of DNS server profiling data structure according to one embodiment of the present invention. The DNS server profiling data structure or "DNS server scoreboard" of the illustrated embodiment includes information utilized in the selection of DNS servers as described with respect to process blocks 304 and 334 of FIGS. 3A and 3B, respectively, according to one embodiment of the present invention. In the illustrated embodiment, the DNS server profiling data structure includes an entry for each DNS server known to the DNS client. Each entry in turn includes a unique DNS server identifier and a score for each type of resource record which may be requested by the client representing the identified DNS server's relative ability to fulfill requests for resource records of that type. In the illustrated embodiment, each score is represented by a numeric value equal to or greater than zero. The generation and maintenance of the score values depicted according to one embodiment of the present invention will be described in greater detail with respect to FIG. 10.

Figure 10:
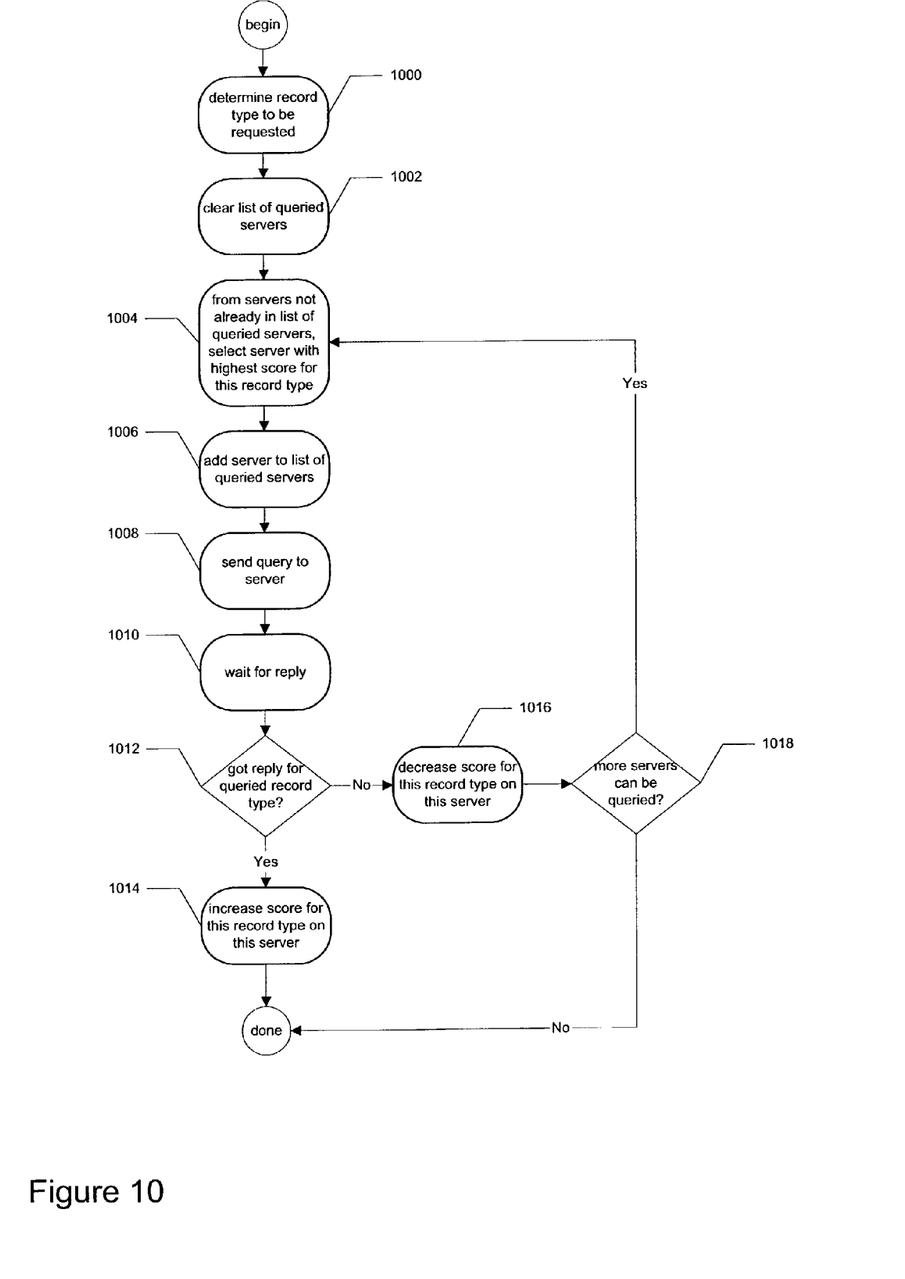
FIG. 10 is a high-level process flow diagram of a DNS server profiling process according to an embodiment of the present invention.

FIG. 10 is a high-level process flow diagram of a DNS server profiling process according to an embodiment of the present invention. In one embodiment, the illustrated process is performed by a DNS client which maintains a DNS server profiling data structure such as that described with respect to FIG. 9. In other alternative embodiments, each DNS client within a communications network may determine whether or not to maintain such a data structure and perform the illustrated process based upon a number of factors (e.g., user selection, the number of DNS servers available to the DNS client, the penalty associated with selecting the incorrect DNS server for DNS query resolution, etc.). When the illustrated process is performed, the resource record type being requested is determined (process block 1000) and an internal list, maintained by the DNS client, of the DNS servers which have been queried is cleared (process block 1002).

Thereafter, the DNS client uses the DNS server profiling data structure to select the DNS server with the highest score value for the requested resource record type from the DNS servers which have not already been queried (process block 1004), adds the selected DNS server to the list of queried servers (process block 1006), sends the DNS query to the selected DNS server (process block 1008), and waits for a reply (process block 1010). Once a reply has been received, a determination is made whether the reply was for the queried resource record type (process block 1012). If so, the score value for the selected DNS server is increased (process block 1014) and the illustrated process is terminated. Otherwise, the score value for the selected DNS server is decreased for the requested resource record type (process block 1016) as shown. Once the DNS server's score value has been appropriately decreased, a determination is made whether any available servers have not been queried for the desired resource record (process block 1018). If such DNS servers are available, a DNS server is selected from those remaining with the highest score value for the requested resource record type (process block 1004) and the illustrated process continues from that point as described.

Consequently, the score value of DNS servers which are capable of resolving queries for particular resource record types are increased, thus increasing the likelihood that those DNS servers will be selected as the first DNS server to be queried. Conversely, the score values of DNS servers which are incapable of resolving queries for resource records of a particular type are decreased, lessening the chance that such DNS servers will be selected initially in the future. While score values have been illustrated herein with respect to FIG. 9 as numeric values equal to or greater than zero, other mechanisms for profiling DNS server ability to resolve queries for resource records of a particular type have been contemplated in alternative embodiments of the invention.

According to one such embodiment, score values may include negative numbers. In another embodiment, upper and/or lower limits on score values are enforced, with the score value being reset to a default value after the limit has been exceeded. According to other embodiments of the present invention, a user may be given the capability to set such limits and/or to reset the DNS server profiling data structure (e.g., when a new DNS server is added or made available within a communications network). In another embodiment, score values having one of two values representing a preferred or deprecated state may be implemented. Available DNS servers may also simply be ordered or prioritized utilizing unique score values of 1 to the number of available DNS servers.

According to another embodiment of the present invention, the amount that a score value is increased or decreased may be varied from one (e.g., different increase and decrease factors and/or different factors based upon the type of resource record requested, the DNS server's prior score value or other circumstances of the request). In another embodiment, a DNS client may cease generating queries for resource records of a particular type and/or generate queries exclusively for resource records of a particular type in response to a score value exceeding a predetermined threshold, a predetermined number of queries being generated without being resolved, etc.

In the foregoing description, the present invention has been described with reference to specific exemplary embodiments thereof. It should be understood however that various modifications and changes may be made thereto without departing from the broader spirit and scope of the present invention as set forth in the appended claims. The specification and drawings are accordingly to be regarded in an illustrative rather than restrictive sense.

What is claimed is:

1. A method comprising:
   maintaining a profile, wherein
      said profile includes an entry for each domain name system (DNS) server known to a DNS client;
   selecting a DNS server, wherein
      said selecting is based on information included in said profile;
   requesting an address from said DNS server, wherein
      said requesting utilizes a first network-layer protocol, and
      said requesting said address from said DNS server is performed in response to said selecting;
   receiving a destination address from said domain name system (DNS) server utilizing said first network-layer protocol in response to said requesting; and
   communicating with a network element associated with said destination address utilizing a second network-layer protocol, wherein
      said second network-layer protocol is different from said first network-layer protocol.

2. The method of claim 1, wherein,
   one of said first protocol and said second protocol is a primary protocol and another of said first protocol and said second protocol is a secondary protocol; and
   said requesting comprises,
      requesting a first address from said DNS server, wherein said first address is formatted according to said primary protocol,
      detecting a request failure in response to said requesting, and
      requesting a second address from said DNS server, wherein said second address is formatted according to said secondary protocol in response to said detecting.

3. The method of claim 1, wherein,
   said receiving comprises,
      receiving an internet protocol version 4 destination address from said DNS server utilizing internet protocol version 6.

4. The method of claim 3, wherein,
   said communicating comprises,
      communicating with a network element associated with said internet protocol version 4 destination address utilizing internet protocol version 4.

5. The method of claim 4, wherein,
   said requesting comprises specifying an A address resource record type utilizing internet protocol version 6.

6. The method of claim 1, wherein,
   said receiving comprises,
      receiving an internet protocol version 6 destination address from said DNS server utilizing internet protocol version 4.

7. The method of claim 6, wherein,
   said communicating comprises,
      communicating with a network element associated with said internet protocol version 6 destination address utilizing internet protocol version 6.

8. The method of claim 7, wherein,
   said requesting comprises specifying an AAAA address resource record type utilizing internet protocol version 4.

9. The method of claim 7, wherein,
   said requesting comprises specifying an A6 address resource record type utilizing internet protocol version 4.

10. The method of claim 1, wherein,
    said maintaining comprises,
       indicating how likely said DNS server is to provide addresses formatted according to each of said first network-layer protocol and said second network-layer protocol.

11. The method of claim 10, wherein,
    said selecting comprises,
       selecting said DNS server from said plurality of DNS servers in response to a determination that said DNS server is a most likely one of said plurality of DNS servers to provide addresses formatted according to said second network-layer protocol.

12. The method of claim 10, wherein,
    said indicating comprises,
       indicating how likely said DNS server is to provide addresses formatted according to each of said first network-layer protocol and said second network-layer protocol utilizing a numeric score value.

13. The method of claim 1, wherein,
one of said first protocol and said second protocol is a primary protocol and another of said first protocol and said second protocol is a secondary protocol;
said requesting comprises,
requesting a first address and a second address substantially simultaneously from said DNS server, wherein said first address is formatted according to said primary protocol and said second address is formatted according to said secondary protocol;
said receiving comprises,
receiving said second address from said DNS server; and
said communicating comprises,
detecting a request failure as to said first address in response to said requesting, and
communicating utilizing said second address in response to said detecting.

14. A machine-readable storage medium having a plurality of instructions executable by a machine embodied therein, wherein said plurality of instructions when executed because said machine to perform a method comprising:
maintaining a profile wherein said profile includes an entry for each DNS server known to a DNS client;
selecting a DNS server wherein said selecting is based on information included in said profile;
requesting an address from said DNS server wherein said requesting utilizes a first network-layer protocol, and
said requesting said address from said DNS server is performed in response to said selecting;
receiving a destination address from said domain name system (DNS) server utilizing said first network-layer protocol in response to said requesting;
communicating with a network element associated with said destination address utilizing a second network-layer protocol, wherein said second network-layer protocol is different from said first network-layer protocol.

15. The machine-readable medium of claim 14, wherein,
one of said first protocol and said second protocol is a primary protocol and another of said first protocol and said second protocol is a secondary protocol, and
said requesting comprises,
requesting a first address from said DNS server, wherein said first address is formatted according to said primary protocol;
detecting a request failure in response to said requesting; and
requesting a second address from said DNS server, wherein said second address is formatted according to said secondary protocol in response to said detecting.

16. The machine-readable medium of claim 14, wherein,
said maintaining comprises,
indicating how likely said DNS server is to provide addresses formatted according to each of said first network-layer protocol and said second network-layer protocol.

17. The machine-readable medium of claim 16, wherein,
said selecting comprises,
selecting said DNS server from said plurality of DNS servers in response to a determination that said DNS server is a most likely one of said plurality of DNS servers to provide addresses formatted according to said second network-layer protocol.

18. The machine-readable medium of claim 16, wherein,
said indicating comprises,
indicating how likely said DNS server is to provide addresses formatted according to each of said first network-layer protocol and said second network-layer protocol utilizing a numeric score value.

19. The machine-readable medium of claim 14, wherein
one of said first protocol and said second protocol is a primary protocol and another of said first protocol and said second protocol is a secondary protocol,
said requesting comprises,
requesting a first address and a second address substantially simultaneously from said DNS server, wherein said first address is formatted according to said primary protocol and said second address is formatted according to said secondary protocol;
said receiving comprises,
receiving said second address from said DNS server; and
said communicating comprises,
detecting a request failure as to said first address in response to said requesting; and
communicating utilizing said second address in response to said detecting.

20. A data processing system comprising:
means for maintaining a profile, wherein
said profile includes an entry for each DNS server known to a DNS client;
means for selecting a DNS server, wherein
said selecting is based on information included in said profile;
means for requesting an address from said DNS server, wherein
said requesting utilizes a first network-layer protocol, and
said requesting said address from said DNS server is performed in response to said selecting;
means for receiving a destination address from said domain name system (DNS) server utilizing said first network-layer protocol in response to said requesting; and
means for communicating with a network element associated with said destination address utilizing a second network-layer protocol, wherein
said second network-layer protocol is different from said first network-layer protocol.

21. The data processing system of claim 20, wherein,
one of said first protocol and said second protocol is a primary protocol and another of said first protocol and said second protocol is a secondary protocol, and
said means for requesting comprises,
means for requesting a first address from said DNS server, wherein said first address is formatted according to said primary protocol;
means for detecting a request failure in response to a request for said first address from said DNS server; and
means for requesting a second address from said DNS server, wherein said second address is formatted according to said secondary protocol in response to a detection of said request failure.

22. The data processing system of claim 20, wherein,
said means for maintaining comprises,
means for indicating how likely said DNS server is to provide addresses formatted according to each of said first network-layer protocol and said second network-layer protocol.

23. The data processing system of claim 22, wherein,
said means for selecting comprises,
means for selecting said DNS server from said plurality of DNS servers in response to a determination that said DNS server is a most likely one of said plurality of DNS servers to provide addresses formatted according to said second network-layer protocol.

24. The data processing system of claim 22, wherein,
said means for indicating comprises,
means for indicating how likely said DNS server is to provide addresses formatted according to each of said first network-layer protocol and said second network-layer protocol utilizing a numeric score value.

25. The data processing system of claim 20, wherein,
one of said first protocol and said second protocol is a primary protocol and another of said first protocol and said second protocol is a secondary protocol,
said means for requesting comprises,
means for requesting a first address and a second address substantially simultaneously from said DNS server, wherein said first address is formatted according to said primary protocol and said second address is formatted according to said secondary protocol;
said means for receiving comprises,
means for receiving said second address from said DNS server; and
said means for communicating comprises,
means for detecting a request failure as to said first address in response to a request for said first address from said DNS server; and
means for communicating utilizing said second address in response to a detection of said request failure as to said first address.

26. A data processing system comprising:
a communications port to couple said data processing system to a communications network, said communications network including a domain name system (DNS) server and a network element;
a processor to maintain a profile, wherein
said profile includes an entry for each DNS server known to a DNS client;
a processor to select a DNS server, wherein
said selecting is based on information included in said profile;
a processor to request an address from said DNS server, wherein
said requesting utilizes a first network-layer protocol, and
said requesting said address from said DNS server is performed in response to said selecting; and
a processor coupled to said communications port to receive a destination address associated with said network element from said DNS server utilizing said first network-layer protocol, in response to said requesting, and
to communicate with said network element utilizing a second network-layer protocol, wherein
said second network-layer protocol is different from said first network-layer protocol.

27. The data processing system of claim 26, wherein,
one of said first protocol and said second protocol is a primary protocol and another of said first protocol and said second protocol is a secondary protocol, and
said processor comprises,
a processor to request a first address from said DNS server, wherein said first address is formatted according to said primary protocol, to detect a request failure in response to a request for said first address from said DNS server, and to request a second address from said DNS server, wherein said second address is formatted according to said secondary protocol in response to a detection of said request failure.

28. The data processing system of claim 26, wherein,
said processor comprises,
a processor to indicate how likely said DNS server is to provide addresses formatted according to each of said first network-layer protocol and said second network-layer protocol.

29. The data processing system of claim 28, wherein,
said processor comprises,
a processor to select said DNS server from said plurality of DNS servers in response to a determination that said DNS server is a most likely one of said plurality of DNS servers to provide addresses formatted according to said second network-layer protocol.

30. The data processing system of claim 28, wherein,
said processor comprises,
a processor to indicate how likely said DNS server is to provide addresses formatted according to each of said first network-layer protocol and said second network-layer protocol utilizing a numeric score value.

31. The data processing system of claim 26, wherein,
one of said first protocol and said second protocol is a primary protocol and another of said first protocol and said second protocol is a secondary protocol, and
said processor comprises,
a processor to request a first address and a second address substantially simultaneously from said DNS server, wherein said first address is formatted according to said primary protocol and said second address is formatted according to said secondary protocol, to receive said second address from said DNS server, to detect a request failure as to said first address in response to a request for said first address from said DNS server, and to communicate with said network element utilizing said second address in response to a detection of said request failure as to said first address.

* * * * *